No. 724,719. PATENTED APR. 7, 1903.
E. P. LINCH.
METHOD OF FORMING WIRE INTO COLLAR OR SLEEVE BUTTONS.
APPLICATION FILED DEC. 31, 1902.
NO MODEL. 2 SHEETS—SHEET 1.
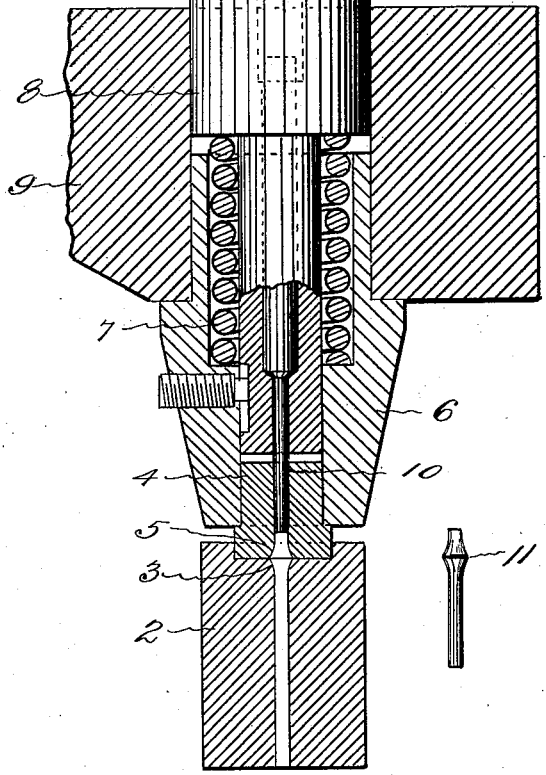
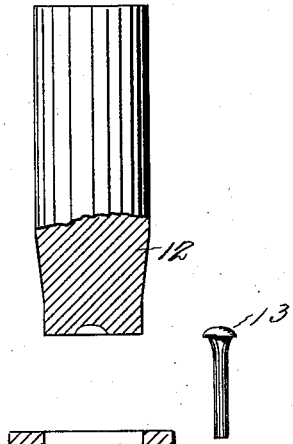
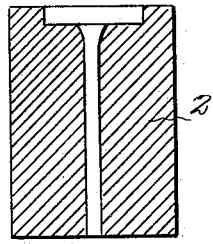
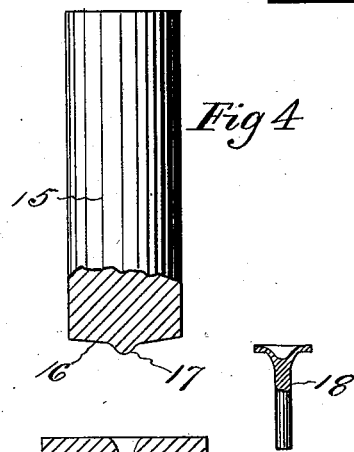
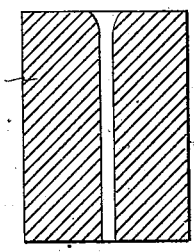
Witnesses
C. F. Kilgore
Ethel M. Lowe
Inventor
Edward P. Linch
by Harry P. Williams
Attorney No. 724,719. PATENTED APR. 7, 1903.
E. P. LINCH.
METHOD OF FORMING WIRE INTO COLLAR OR SLEEVE BUTTONS.
APPLICATION FILED DEC. 31, 1902.
NO MODEL. 2 SHEETS—SHEET 2.
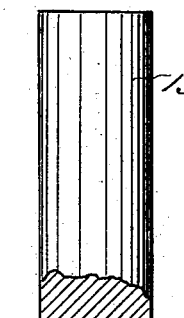
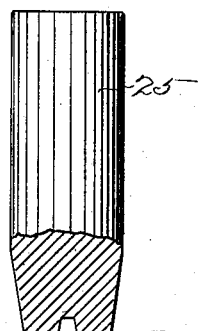
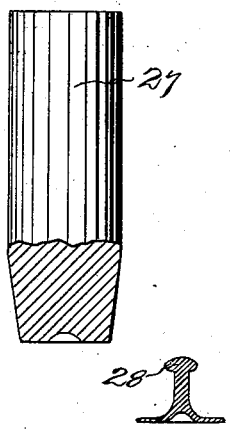
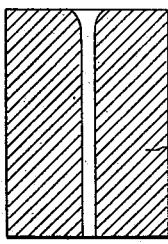
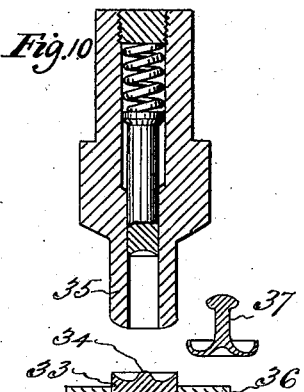
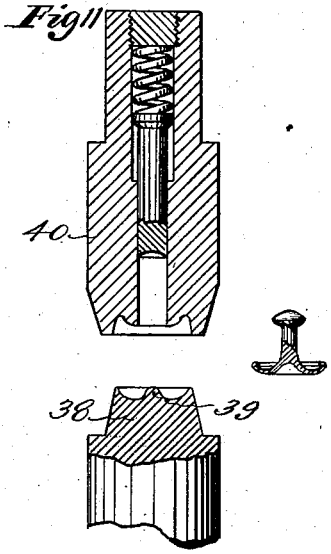
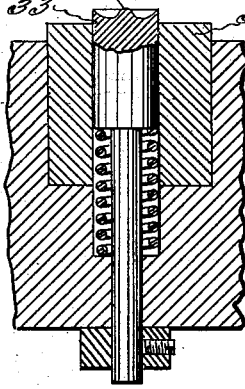
Witnesses
C. F. Kilgor,
Ethel M. Lowe.
Inventor
Edward P. Linch by
Harry P. Williams
Attorney

UNITED STATES PATENT OFFICE.

EDWARD P. LINCH, OF WATERBURY, CONNECTICUT.

METHOD OF FORMING WIRE INTO COLLAR OR SLEEVE BUTTONS.

SPECIFICATION forming part of Letters Patent No. 724,719, dated April 7, 1903.

Application filed December 31, 1902. Serial No. 137,291. (No model.)

*To all whom it may concern:*

Be it known that I, EDWARD P. LINCH, a citizen of the United States, residing at Waterbury, in the county of New Haven and State of Connecticut, have invented certain new and useful Improvements in Methods of Forming Wire into Collar or Sleeve Buttons, of which the following is a specification.

This invention relates to a method of forming a continuous length of solid wire into collar and sleeve buttons.

A collar or sleeve button should have a back that is so large that it will not pull through the buttonhole and is so round and smooth that it will not irritate the skin or fray the linen, should have a head that will easily pass through a buttonhole in stiffened linen and not draw out, and should have a post that is small in diameter where it occupies the buttonhole and is so shaped and joined to the back and head that the metal will not be crystallized or the texture ruptured during the process of making the button and the head or the back will not break off when the button is being thrust through or drawn from stiff linen.

The object is to provide a process consisting of simple operations which can be performed very rapidly upon wire without destroying the texture of the metal and produce solid strong buttons of approved design.

The accompanying drawings illustrate the blanks at the several stages of the process and the tools for operating upon the blanks and forming a piece of solid wire into a button having these characteristics.

Figure 1 shows a short piece of wire from which one of these buttons is produced. Fig. 2 shows the tools for operating upon this blank and the result of this operation. Fig. 3 shows the tools for performing the second operation and the result of that operation. Fig. 4 shows the tools for performing the next operation and the result of that operation. Fig. 5 shows the tools for performing the next operation and the result of that operation. Fig. 6 shows the tools for performing the following operation and the result of that operation. Fig. 7 shows the tools for performing the next operation and the result of that operation. Fig. 8 shows the tools for performing the next operation and the result of that operation. Fig. 9 shows the tools for performing the next operation and the result of that operation. Fig. 10 shows the tools for performing the following operation and the result of that operation. Fig. 11 shows the final operation and the completed button which results.

The wire which is used for producing these buttons may be any suitable stock having the requisite characteristics. If high-grade buttons are to be produced, the wire may be the desired precious metal, and if cheap buttons are to be produced, and this process is particularly adapted for producing cheap buttons in very large quantities, a base-metal wire, such as a wire formed of gilt metal or of copper, may be employed. This wire is cut into short lengths by suitable tools, so as to form the blanks 1, Fig. 1. These blanks are fed by suitable means into a die 2, which has an opening through it that fits the wire. The operative end of the opening in this die tapers outwardly, as shown at 3 in Fig. 2. When the blank is located in this die, a die 4 is advanced into a recess in the face and is held against the die 2. This latter die has an opening through it that corresponds with the opening through the fixed die for receiving the blank, and the operative end of this opening is tapered outwardly, as shown at 5 in Fig. 2. The movable die is held in a plunger 6, that is forced toward the fixed die by a spring 7, that thrusts against a plug 8, inserted in the die-holder 9. When these dies are together, the punch 10 is forced against the end of the blank and by compression expands the metal into the enlarged space formed by the tapering ends of the openings through the dies. This forms a swell 11, Fig. 2, near one end of the blank, which swell curves outwardly in both directions from the diameter of the wire to the largest diameter of the swelled portion. The plunger and movable die are then withdrawn, and the projecting end of the wire, which is the end from which the back of the button is formed, is struck a blow by the punch 12. This compresses the blank endwise and flows the metal at the back end into the swelled portion and increases its diameter and forms an enlargement 13, Fig. 3. The blank is then fed into a die 14, which has an opening through it which fits the wire and the swelled portion in front of the enlarged back end. After the blank has been located in this die it is compressed by a blow from the punch 15, which has a sloping end 16, with a central teat 17. This forms a cavity in the enlarged end and spreads the metal outwardly, so as to increase the diameter of the end. As the end of the die 14 is flat and the end of the punch 15 is sloping, the metal near the outer edges of the end of the blank is thicker than near the center. The operation of this punching-die produces the blank 18, Fig. 4. After the punch 15 has been withdrawn a punch 19 may be driven against the back face, so as to still further increase the diameter of the back end. As the preceding operation left the back end slightly thicker near the edge, the metal at the edge flows outward easily under the compression of the punch 19, so as to increase the diameter of the back end. The blank 20, Fig. 5, is then fed into the opening in a die 21 and the end subjected to the blow of a punch 22, which presses out all of the marks and wrinkles which may have resulted from the previous operations and leaves the blank 23 with a smooth thin back. The blank is then fed into an open die 24 and subjected to the blow of a punch 25, which centers and increases the diameter of the head end and forms the blank 26, Fig. 7. After the punch 25 has been withdrawn the blank in the same die is subjected to the blow of a punch 27. This forms the head 28, Fig. 8. The blank is then fed onto a die 29 having a teat 30, which centers it, and the trimming-punch 31 is caused to trim off or true up the edge of the back, Fig. 9. The blank 32 is then advanced onto a collapsible die 33, the end of which is concaved and provided with a centering-teat 34. When the punch 35 with the convex end is advanced, the back of the blank is dished, and as the collapsible die 33 is forced into the fixed die 36 the edge of the back is turned up. The blank 37 is then advanced to a die 38 having a concaved face and centering-teat 39 and subjected to the action of the punch 40, the recess in which is so shaped that the turned-up edge of the blank is rolled over and the button completed. This button may then be buffed and, if desired, plated.

The solid post of this button is thin at the middle and gradually curves outwardly to the base, and it is joined to the head by a short fillet. The operations are all very simple, so that they can be performed very rapidly, and the metal is acted upon in such a manner that its texture is not ruptured or crystallized.

The heads and backs cannot be pulled from the posts, which of course may be long or short, as desired. The heads may be ball-shaped, dome-shaped, or lens-shaped, as shown, and they may be ornamented as desired—that is, they may have polished, Roman, chased, nugget, or enamel finishes.

These buttons may be used for collar or sleeve buttons or for any other purposes for which they are suitable.

I claim as my invention—

A method of forming a continuous length of solid wire into collar-buttons which consists in feeding the wire and cutting from it a short blank, compressing the blank endwise and forming a gradually increasing and decreasing swell near the back end, compressing the blank endwise and increasing the diameter of the back end, compressing the blank endwise and forming a cavity in and spreading out the metal of the enlarged end, smoothing the spread end by compression, compressing the blank endwise and forming a head at the other end and trimming, dishing, turning up and rolling over the edge of the back, and thus forming a solid one-piece collar-button with a dome head and mushroom back and a post that increases in diameter in curved lines as it approaches and joins the back, substantially as specified.

EDWARD P. LINCH.

Witnesses:
N. W. CUMMINS,
F. H. SENG.